United States Patent [19]

Greene, deceased

[11] Patent Number: 4,654,009

[45] Date of Patent: Mar. 31, 1987

[54] VOICE IMPROVING DEVICE

[75] Inventor: Herbert Greene, deceased, late of New York, N.Y., by Charles Bershatsky, administrator

[73] Assignee: Richard McLaughlin, Chappaqua, N.Y.

[21] Appl. No.: 802,971

[22] Filed: Nov. 29, 1985

[51] Int. Cl.⁴ .............................................. G09B 19/04
[52] U.S. Cl. .................................. 434/185; 84/466; 128/25 R; 128/51; 128/55; 272/99
[58] Field of Search .................. 128/51, 54, 55, 52, 128/53, 44, 25 R, 28, 42; 84/466; 434/185; 272/99, 127

[56] References Cited

U.S. PATENT DOCUMENTS

| | | | |
|---|---|---|---|
| 40,865 | 12/1863 | Taylor | 128/51 |
| 1,776,806 | 9/1930 | Carlson | 272/127 X |
| 1,953,436 | 4/1934 | Saunders | 128/51 |
| 2,053,081 | 9/1936 | Hetherington | 128/51 |
| 3,401,686 | 9/1968 | Edwards | 128/54 X |
| 3,664,331 | 5/1972 | Filipouici | 128/51 |

FOREIGN PATENT DOCUMENTS

| | | | |
|---|---|---|---|
| 23009 | 4/1918 | Denmark | 128/54 |
| 410104 | 5/1910 | France | 128/54 |

*Primary Examiner*—Edgar S. Burr
*Assistant Examiner*—Moshe I. Cohen
*Attorney, Agent, or Firm*—Charles E. Baxley

[57] ABSTRACT

The voice improving device comprises a means which generally takes the form of a soft glove-like arrangement which is mounted to depress an individual's diaphragm in a range of one to twelve and one half taps per second. Also support means which can take the form of a table may serve as a mount for the soft glove-like means which can be disposed horizontally or inclined upwardly towards the diaphragm or decline downwardly towards the diaphragm in order to depress it. The soft glove-like means may be reciprocated, via moving means which can take the form of a blower or motor connected to the glove-like means, to depress the diaphragm in a range between one to twelve and one half times a second, preferably this range would fall in the 3.5 to 10 times per second category.

5 Claims, 3 Drawing Figures

VOICE IMPROVING DEVICE

This invention relates to voice improving devices and more particularly to an arrangement which has a softly covered arm positioned to depress the diaphragm and includes a member to move this softly covered arm to tap or depress the diaphragm at a predetermined rate. The end result is an increase in the vibrato range of tones to provide a fuller, richer, deeper more textured sound to the voice.

Other objects of the invention, as well as the advantages and novel features thereof will become apparent from a perusal of the following description when read in connection with the accompanying drawings, in which.

Figure 1:
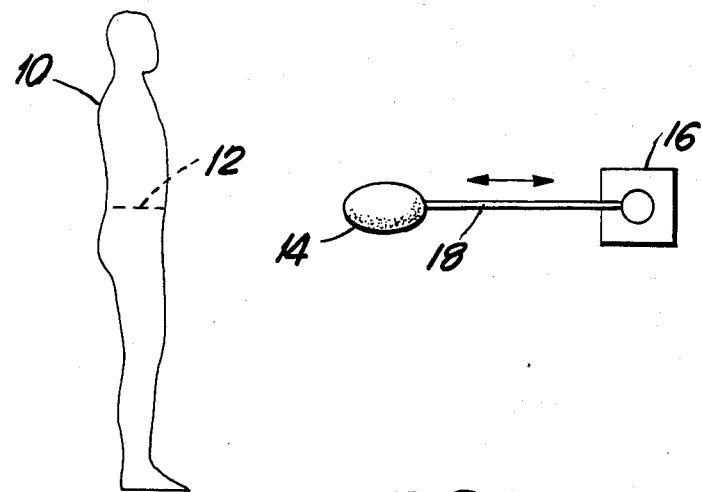
FIG. 1 is a diagrammatic plan view of the voice improving device constructed in accordance with the invention.

Referring now to FIG. 1 of the drawings, the reference numeral 10 designates an individual, the dotted line indicates the approximate location of the diaphragm 12 of said individual. A means 14 which preferably is a soft glove-like arrangement is connected to a motor or moving element which is constructed in any well known fashion to reciprocate the glove-like arrangement.

While a glove-like arrangement is shown to tap the diaphragm, a belt arrangement could be fashioned to be moved to tap the diaphragm all within the scope of the present invention.

Figure 2:
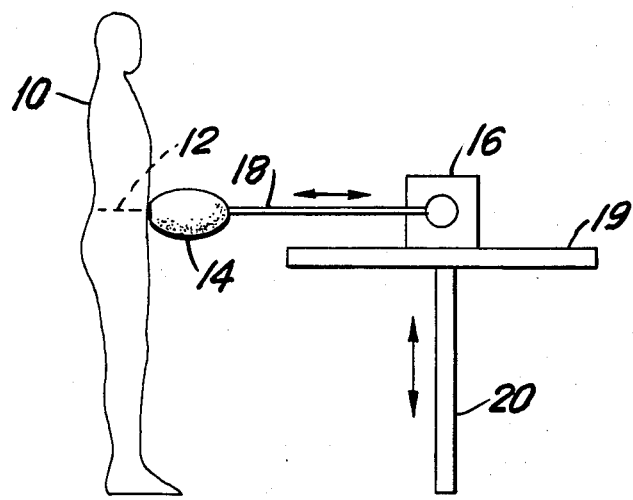
FIG. 2 is a partial diagrammatic plan view of the voice improving device showing the position of the soft glove-like means relative the diaphragm and it also shows an adjustable support which serves as a mount for the motor or moving means also shown as connected to the soft glove-like means.

As shown in FIG. 2, the soft glove-like device 14 is positioned next to the diaphragm 12 and the motor or moving means 16 is actuated so that the glove-like device 14, which is connected to the motor or driving means by a rod or similar type of arrangement 18, is reciprocated to tap or depress the diaphragm from one to twelve and one half times a second. The preferred range of tapping falls in the category of three and one half to ten times per second.

It will be understood that while a motor moving device is shown, a receiver which is triggered electrically to move the glove-like means may also be used all within the teaching of the invention.

Figure 3:
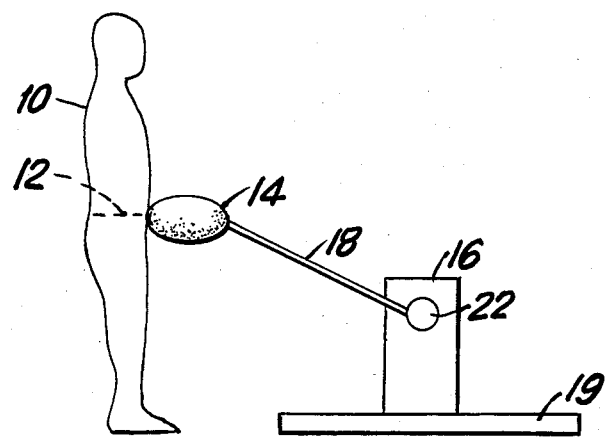
FIG. 3 is a view similar to FIG. 2 however showing an inclined glove-like means also in near abutment with the diaphragm.

Any type of support means can be fashioned to hold the motor or moving element. For example, the support means could take the form of a table 19 as is shown in FIG. 2 and it may be provided with an adjustable leg 20 to position the glove-like means 14 to nearly abut the diaphragm 12. It is not essential that the support be adjustable, this may be accomplished through the means shown in FIG. 3 wherein the floor or other support type of arrangement could be fashioned to hold the moving or driving means or motor 16. The glove-like means and moving element may be detachably connected as at 22. This connection may be constructed in any well known manner to incline the glove-like means 14 to abut the diaphragm 12 as shown in FIG. 3. For example, a male female interlocking connector may be used. Alternatively the support could be higher than the diaphragm and the glove-like means could decline from the higher level for the purpose of depressing the diaphragm. Appropriate connection as at 22 can be made to provide such an arrangement in a number of known manners.

A holding member such as a handle (not shown) may be mounted on the support member 19. In this manner a person using the voice improving device may more easily maintain his position relative the glove-like means 14 to optimize the voice improving benefits.

The exercise time span or period of tapping which has been found most beneficial for increasing the vibrato, that is, the range of tones to provide a more richer, deeper or textured sound rather than a flat tone was determined to be a half hour; however, improvement in the vibrato can be achieved and a drop in octave and an attractive quaver which gives a fuller more authoritative sound can be accomplished in less time, say five (5) minutes.

It is to be understood that the above described embodiments of the invention are illustrative only in that modifications thereof may occur to those skilled in the art. Accordingly, the invention is not to be regarded as limiting to the embodiment disclosed herein but is to be limited only as defined by the appended claims.

I claim:

1. A voice improving device comprising support means, a soft glove-like means for gently depressing the diaphragm connected to the support means so that the soft glove-like means can be positioned in an optimum location relative to the diaphragm to depress said diaphragm and means for moving the soft glove-like means and connected thereto so that said soft glove-like means depresses the diaphragm over a range of five to ten times a second.

2. A voice improving device of claim 1 wherein said support means is adjustable and said soft glove-like means is mounted on the support means so that said soft glove-like means can be positioned in an optimum location relative to the diaphragm to depress said diaphragm.

3. The voice improving device of claim 2 wherein said adjustable support means includes moving means for reciprocating the soft glove-like means to depress the diaphragm.

4. The device of claim 3 including a holding-like arrangement mounted on the support means so that the user may optimize the positioning of the soft glove-like means relative to the diaphragm.

5. A method of improving the voice comprising positioning a soft glove-like means so that it may depress the diaphragm, reciprocating the soft glove-like means so that it depresses the diaphragm at a rate of from five to ten times per second.

* * * * *